United States Patent [19]
Hashizume et al.

[11] Patent Number: 6,130,444
[45] Date of Patent: Oct. 10, 2000

[54] OPTICAL FIBER SECURED WITH A PHOTOSETTING RESIN COVERED WITH A UV LIGHT-TRANSMISSIVE PLATE

[75] Inventors: Shozi Hashizume; Yoshihiro Hasegawa; Hironori Ueda, all of Tokyo, Japan

[73] Assignee: NEC Corporation, Tokyo, Japan

[21] Appl. No.: 09/249,577

[22] Filed: Feb. 12, 1999

[30] Foreign Application Priority Data

Feb. 27, 1998 [JP] Japan .................................. 10-048279

[51] Int. Cl.⁷ .............................. H01L 27/15; G02B 6/36
[52] U.S. Cl. ................. 257/81; 257/82; 257/98; 257/99; 385/88; 385/92
[58] Field of Search ................... 257/80, 81, 82, 257/84, 98, 99, 432, 433; 385/88, 89, 92, 94

[56] References Cited

U.S. PATENT DOCUMENTS 4,752,109  6/1988  Gordon et al. ............................ 385/92
5,737,467  4/1998  Kato et al. ............................... 385/92

*Primary Examiner*—Minh Loan Tran
*Attorney, Agent, or Firm*—Young & Thompson

[57] ABSTRACT

An optical semiconductor device, having an optical element mounted in a case and an optical fiber fixed to the case with a first photosetting resin, includes a transparent plate placed on a surface layer portion of the first photosetting resin to transmit light that cures the first photosetting resin. The transparent plate is integrated with the cured photosetting resin, and the optical element is a light emitting element.

11 Claims, 13 Drawing Sheets

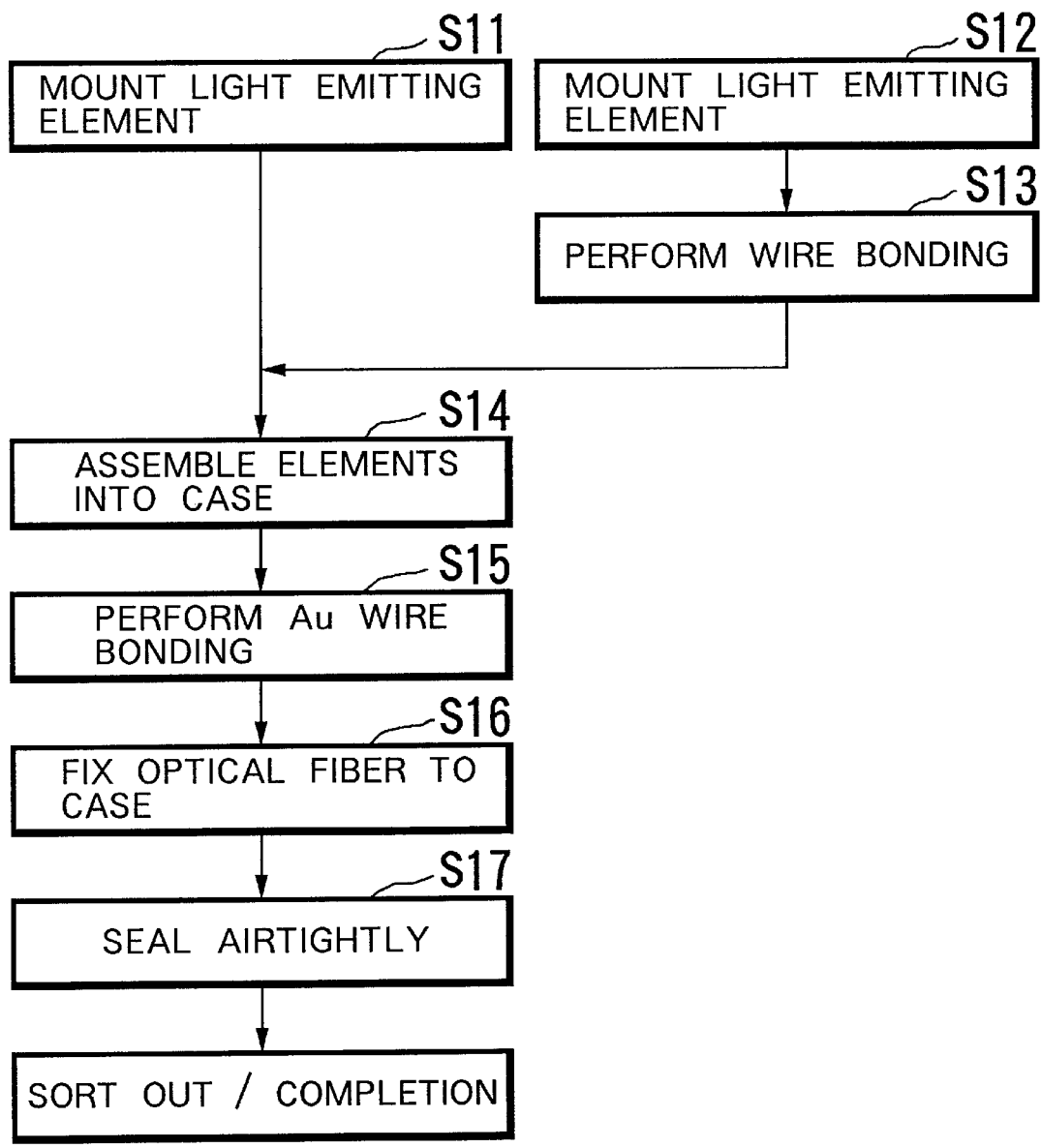

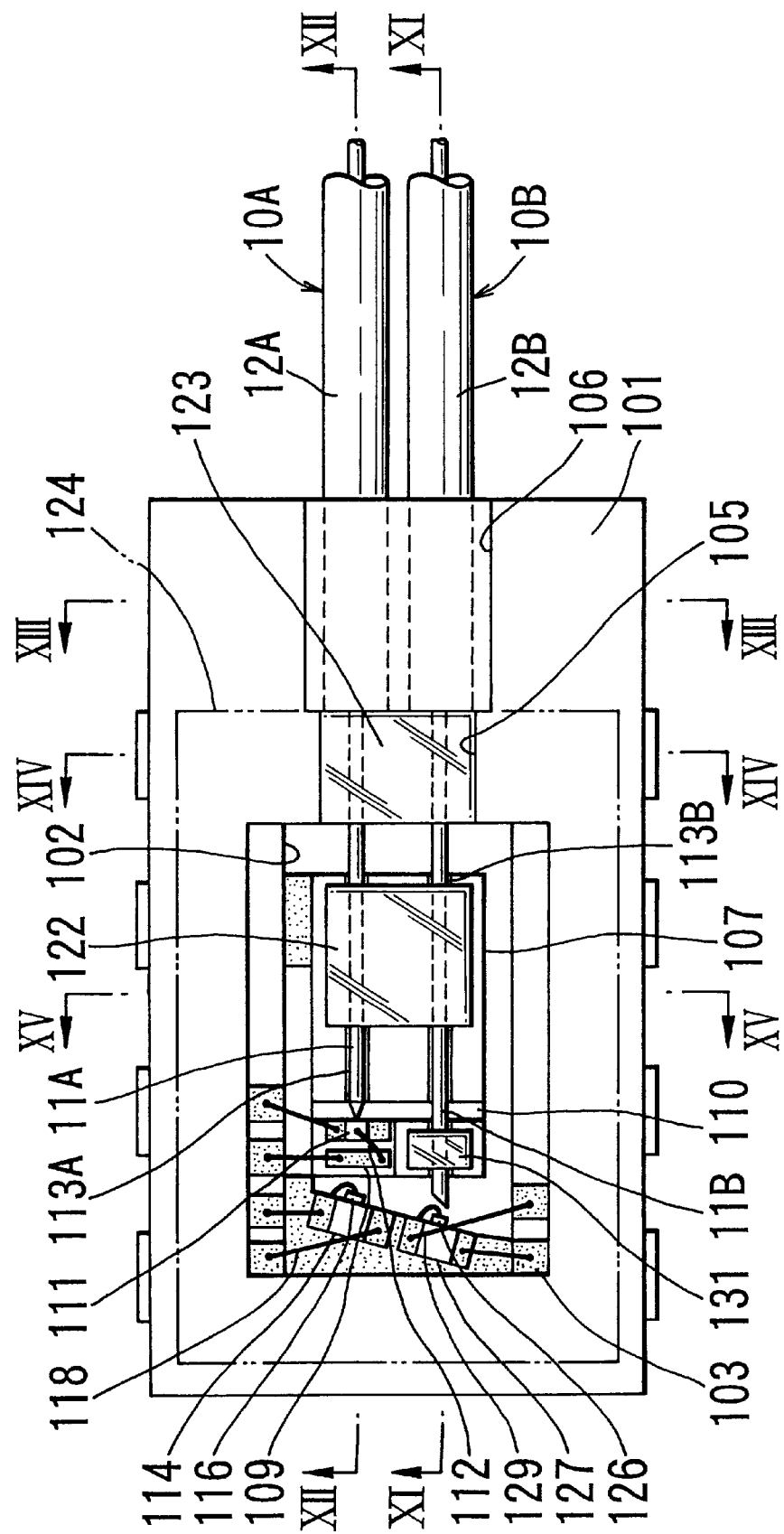

OPTICAL FIBER SECURED WITH A PHOTOSETTING RESIN COVERED WITH A UV LIGHT-TRANSMISSIVE PLATE

BACKGROUND OF THE INVENTION

Field of the Invention

The present invention relates to an optical semiconductor device having an optical element such as a light emitting element or light receiving element, and an optical transmission optical fiber optically coupled to the optical element and, more particularly, to a mounting structure for the optical fiber.

DESCRIPTION OF THE PRIOR ART

In an optical semiconductor device of this type, an optical element is mounted in a case. An optical fiber is axially aligned with the optical element and fixed to the case. After that, the optical coupling region of the optical element and optical fiber is airtightly sealed. In the optical fiber, a bare fiber made of glass is covered with a polyethylene jacket. The jacket is not thermally resistant. If the jacket portion is fixed to the case, the fixed state is degraded by heat, and the axial position of the jacket shifts with respect to the optical element. To prevent this, a structure in which the jacket is removed to expose the bare fiber, and the bare fiber is fixed to the case is conventionally proposed. Since the bare fiber is very thin and has a low mechanical strength, conventionally, a mounting structure using a reinforcing metal capillary or metal ferrule is used. This structure has a large number of components constituting the optical semiconductor device and a large number of assembling steps, leading to an increase in cost of the optical semiconductor device.

In order to reduce the number of components, a structure in which the optical fiber is fixed to the case with a photosetting resin, e.g., an ultraviolet curing resin, is proposed. For example, in Japanese Unexamined Patent Publication No. 8-335744, the bare fiber of an optical fiber is mounted on an optical fiber support member made of glass, a plastic, silicon, a resin, a ceramic material, or the like by using an ultraviolet curing resin, and this optical fiber support member is fixed to the case with the ultraviolet curing resin. Since this structure does not require a metal capillary or metal ferrule, it is effective in reducing the number of components. However, this structure requires the optical fiber support member that must be machined specially, and the bare fiber of the optical fiber must be inserted in a small hole formed in the optical fiber support member, still leaving a problem in simplifying the structure and the respective working steps in assembly.

The present inventor tried to fix the bare fiber of the optical fiber directly to the case without using such an optical fiber support member. For this purpose, a notch or groove for guiding the bare fiber is formed in part of the case. The bare fiber is inserted in this notch or groove, and fixed with a photosetting resin, e.g., an ultraviolet curing resin. With this countermeasure, it suffices to position the optical axis of the bare fiber with respect to an optical element mounted in the case in advance, and to fix the bare fiber in this state with the photosetting resin. Both the number of components and the number of working steps in assembly can be reduced, so that a very low-cost optical semiconductor device can be realized.

When this optical semiconductor device was manufactured on a trial base by using an ultraviolet curing resin as the photosetting resin and was subjected to performance evaluation, the following problems arose. When fixing the bare fiber with the ultraviolet curing resin, since the ultraviolet curing resin has high ultraviolet ray absorbency, if the thickness of ultraviolet curing resin exceeds 0.4 mm, a sufficiently large light amount of ultraviolet ray does not reach the lower layer of the ultraviolet curing resin. Then, sufficient curing cannot be performed, and the fixing strength of the bare fiber tends to be insufficient. In particular, the ultraviolet curing resin in the notch or groove where the bare fiber is inserted cannot be sufficiently cured. When the bare fiber exposed from the jacket is fixed with the ultraviolet curing resin to be entirely covered by it, the amount of ultraviolet curing resin increases. When this ultraviolet curing resin is cured, cracking occurs in the resin to decrease the fixing strength. In this case, in order to prevent this, silica was filled in the ultraviolet curing resin, and the amount of silica as a filler was changed, so that the coefficient of thermal expansion of the ultraviolet curing resin at a glass transition temperature or less was decreased from $7.7\text{E}-5/°$ C. to $1.0\text{E}-5/°$ C. However, it was difficult to improve the fixing strength. When the coefficient of thermal expansion was decreased to less than $1.5\text{E}-5/°$ C., the viscosity of the ultraviolet curing resin increased sharply to impair the filling performance. It was confirmed that a through hole was formed due to filling failure, thus impairing the reliability in airtightness. Since the bare fiber is completely covered with the ultraviolet curing resin and fixed, it is damaged by a stress applied to the case or optical fiber. Then, misalignment with the optical element occurs to fluctuate the output. When the stress is large, the bare fiber is disconnected to make a defective optical semiconductor device.

SUMMARY OF THE INVENTION

The present invention has been made in view of the situations of the prior art described above, and has as its object to provide a highly reliable optical semiconductor device in which the number of assembling steps is reduced, the fixing strength of the bare fiber of an optical fiber with a photosetting resin is increased, cracking in the photosetting resin is prevented, and the stress on the bare fiber can be moderated.

In order to achieve the above object, according to the first aspect of the present invention, there is provided an optical semiconductor device having an optical element mounted in a case and an optical fiber fixed to the case with a first photosetting resin, comprising a transparent plate placed on a surface layer portion of the photosetting resin to transmit light that cures the photosetting resin.

The transparent plate of the optical semiconductor device according to the first aspect is integrated with the cured photosetting resin.

The optical fiber of the optical semiconductor device according to the first aspect comprises a bare fiber and a jacket covering the bare fiber. The bare fiber is placed in a recess formed in the case or a member mounted on the case, and is fixed between a second photosetting resin filled in the recess and the transparent plate placed on the surface layer portion of the first photosetting resin to be integrated with the first photosetting resin.

The bare fiber of the optical fiber of the optical semiconductor device according to the first aspect is fixed to the case with the first and second photosetting resins at a plurality of portions spaced apart from each other in its longitudinal direction.

According to the second aspect of the present invention, there is provided an optical semiconductor device comprising a case, a heat sink fixed in a cavity recessed in an upper surface of the case, an optical element mounted in the cavity, a bare fiber guide groove formed in a surface of the heat sink to have a V-shaped section, a bare fiber airtight sealing recess formed in the upper surface of the case facing the cavity, an optical fiber fixing recess formed in the upper surface of the case to be continuous to the bare fiber airtight sealing recess, an optical fiber having a bare fiber exposed at one end portion thereof, the disposed bare fiber being disposed to extend from the bare fiber guide groove to the bare fiber airtight sealing recess, and the optical fiber having a jacket disposed in the optical fiber fixing recess, a photosetting resin filled in each of the bare fiber guide groove, the bare fiber airtight sealing recess, and the optical fiber fixing recess, a transparent plate which can transmit light for curing the photosetting resin, is placed on a surface layer portion of the photosetting resin to cover the bare fiber guide groove and the bare fiber airtight sealing recess, and is integrated with the cured photosetting resin, and an airtight sealing cap fixed to the upper surface of the case with the photosetting resin applied around the cavity in the upper surface of the case to cover the cavity.

In the second aspect, a light emitting element and a light receiving element may be mounted each as the optical element. The optical fiber may comprise two optical fibers each having one end portion disposed to oppose a corresponding one of the light emitting and receiving elements. The two optical fibers may have bare fibers fixed in two bare fiber guide grooves formed in the surface of the heat sink with the photosetting resin and the transparent plate. The airtight sealing cap may be formed with a light-shielding film formed at its region covering the cavity. In particular, in the present invention, it is preferable that the photosetting resin be an ultraviolet curing resin and the transparent plate be a glass plate that can transmit an ultraviolet ray.

In the present invention, since an optical fiber, particularly a bare fiber, is directly fixed to the case or heat sink by using the ultraviolet curing resin, a member that must be specially worked to hold the bare fiber is not necessary. The bare fiber is fixed with the photosetting resin and the transparent plate. Even if the volume of the photosetting resin is decreased by an amount corresponding to the volume of the transparent plate, a required sufficiently high strength can be assured, and cracking is decreased by a decrease in the resin amount. The transparent plate transmits light for curing the photosetting resin. Therefore, even the photosetting resin present under the transparent plate can be irradiated with a sufficient amount of light. Thus, the photosetting resin can be sufficiently cured even to its lower layer, further increasing the fixing strength of the bare fiber. Since the bare fiber is fixed to the case at portions separated from each other at required gaps in the direction of length, the stress applied to the case or optical fiber is absorbed by portions among the fixed portions of the bare fiber, so that the influence of stress on the bare fiber is suppressed.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 7 is a flow chart showing the steps in manufacturing the first embodiment;

FIG. 10 is a schematic plan view showing the second embodiment of the present invention.

DETAILED DESCRIPTION OF PREFERRED EMBODIMENTS

The several preferred embodiments of the present invention will be described in detail with reference to the accompanying drawings.

Figure 1:
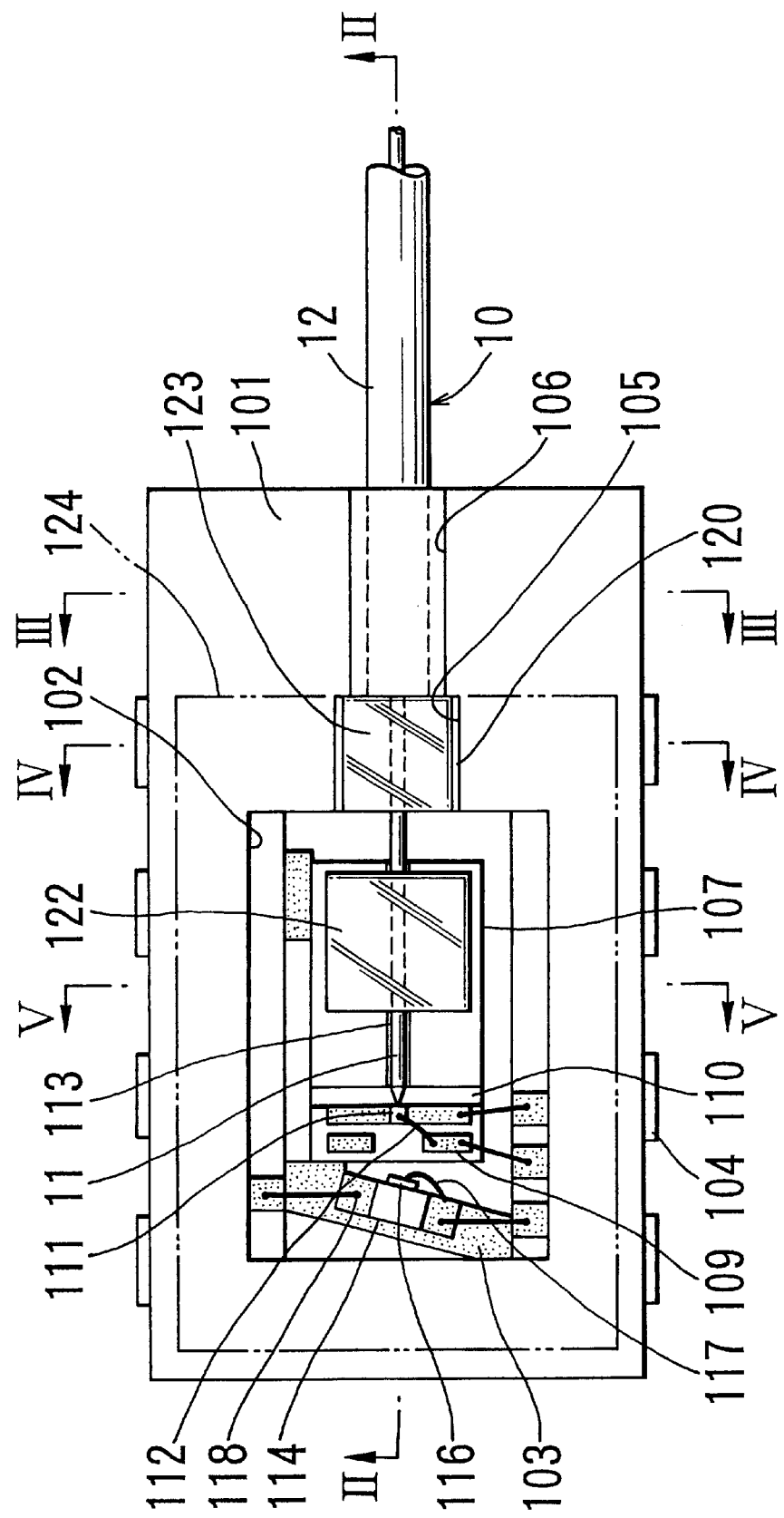
FIG. 1 is a schematic plan view showing the first embodiment of the present invention
Figure 2:
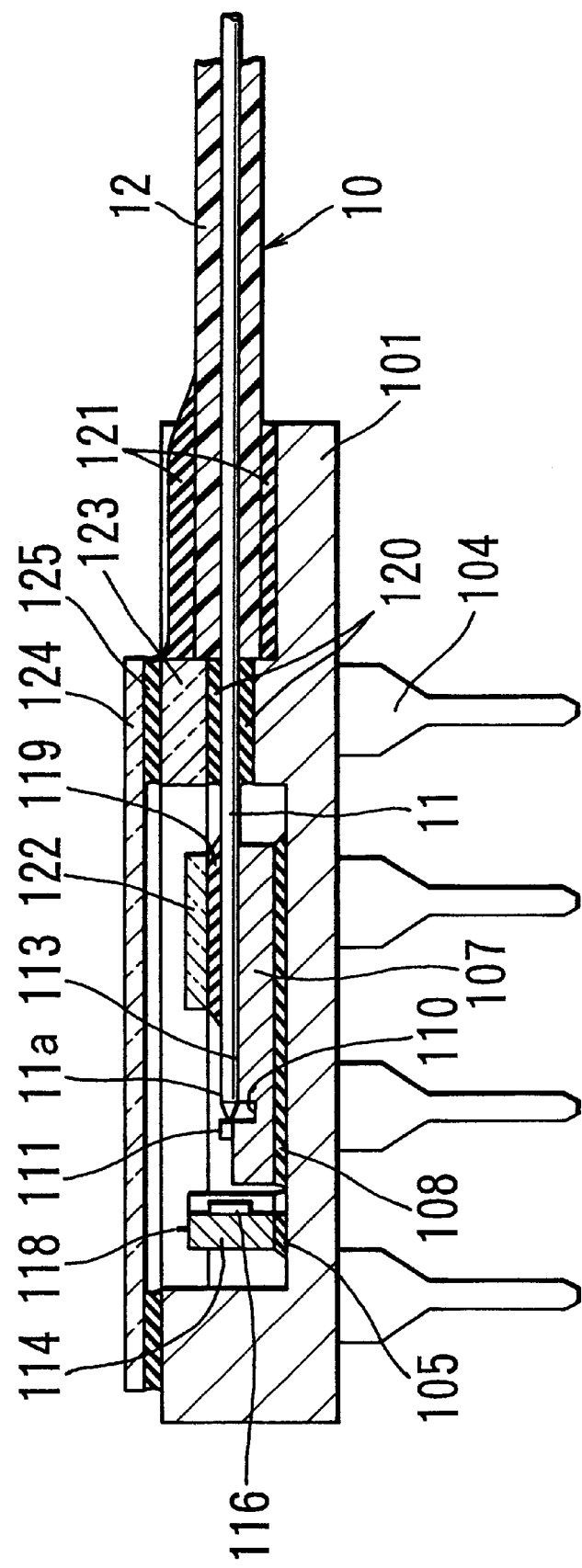
FIGS. 2 to 5 are sectional views taken along the lines II—II, III—III, IV—IV, and V—V, respectively, of FIG. 1.
Figure 3:
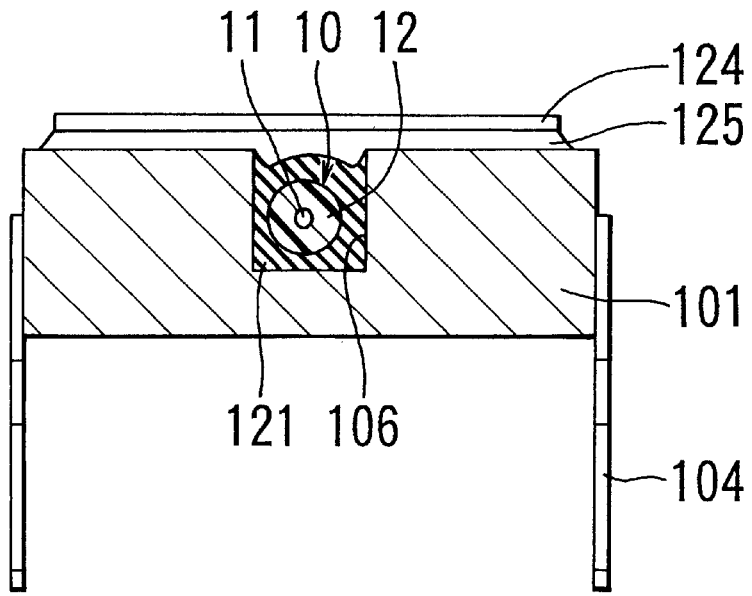
Figure 4:
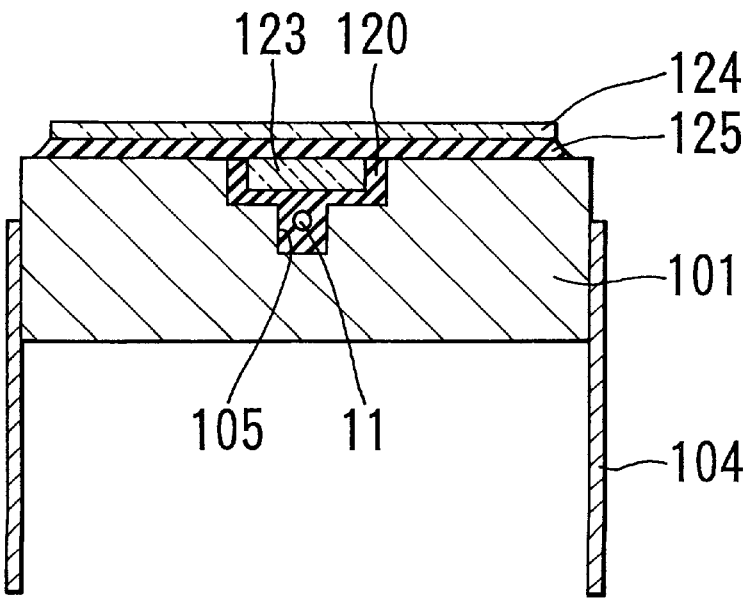
Figure 5:
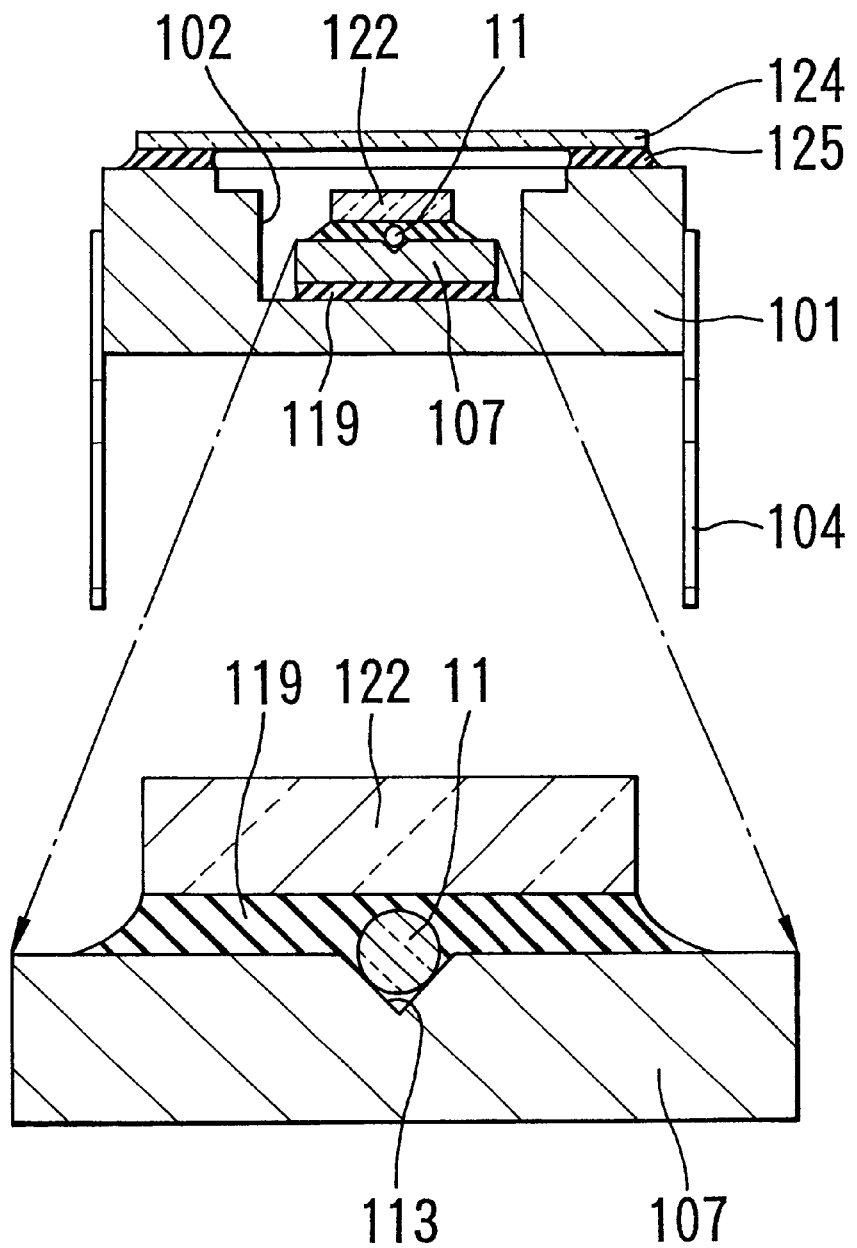
Figure 6:
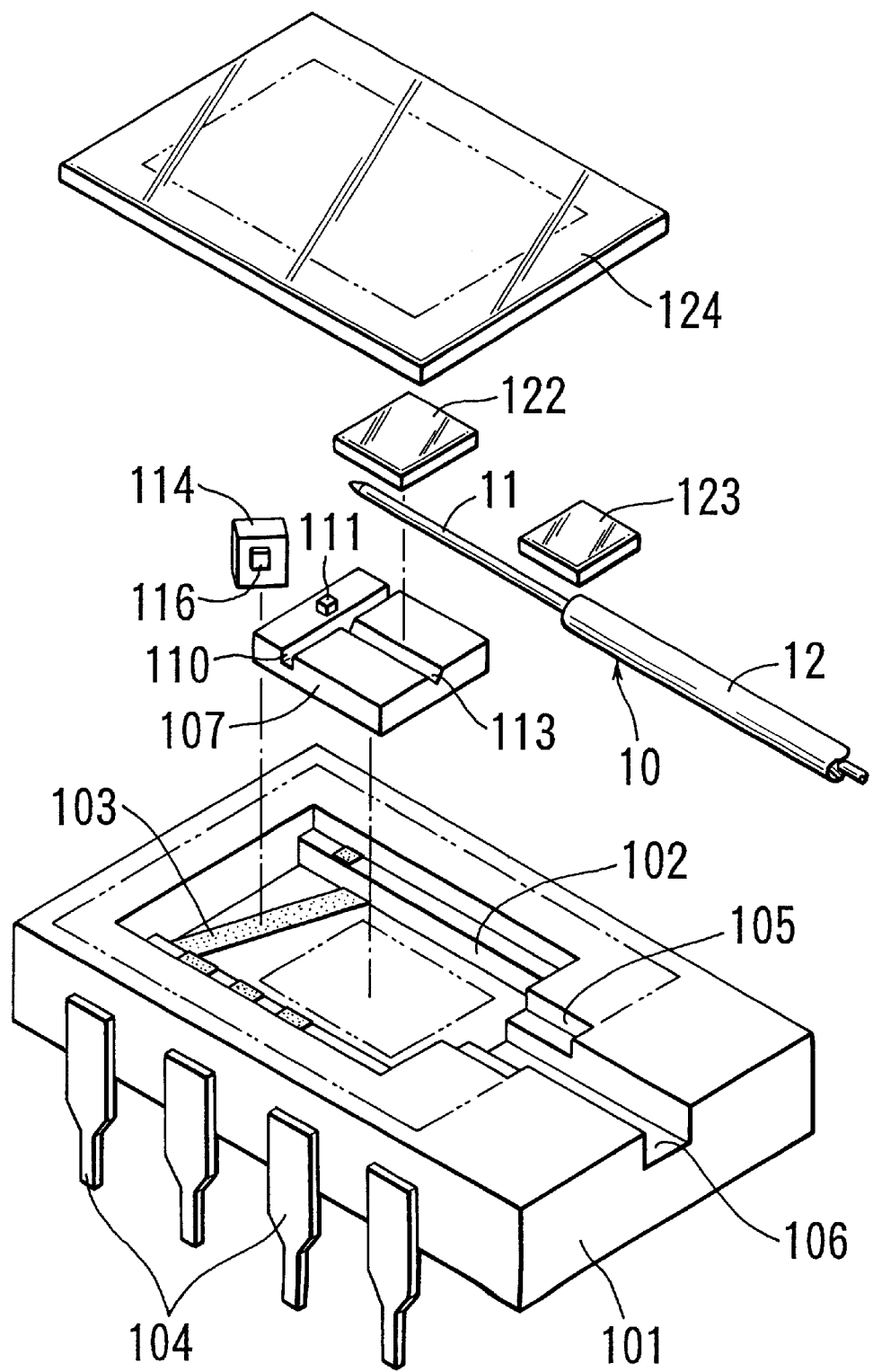
FIG. 6 is a schematically exploded perspective view showing the first embodiment of the present invention.

FIG. 1 is a plan view of the first embodiment of the present invention, and FIGS. 2 to 5 are sectional views taken along the lines II—II, III—III, IV—IV, and V—V, respectively, of FIG. 1. FIG. 6 is a schematic perspective view showing the main portion in an exploded state. Referring to FIGS. 1 to 6, an optical fiber 10 is constituted by a bare fiber 11 made of glass or the like, and a jacket 12 made of a polyethylene resin or the like to cover the bare fiber 11. A case 101, to which one end portion of the optical fiber 10 is connected and supported, has a rectangular shape and is made of a ceramic material, e.g., alumina or aluminum nitride. A rectangular cavity 102 is formed in a region of the upper surface of the case 101 close to one end in the longitudinal direction. A necessary metallized pattern 103 is formed on the inner bottom surface of the cavity 102. This metallized pattern 103 extends to the side surface of the case 101 and is exposed. Externally extending leads 104 are brazed to this exposed surface with an AgCu alloy. A bare fiber airtight sealing recess 105 and an optical fiber fixing recess 106 continuous to it are formed at a position on the other end side of the upper surface of the case 101 facing the cavity 102. The bare fiber airtight sealing recess 105 forms a stepped portion having a low central portion and has a size enough to receive the bare fiber 11. The optical fiber fixing recess 106 is formed to have a size enough to receive the jacket 12 of the optical fiber 10.

A heat sink 107 formed of a silicon plate is mounted in the cavity 102 of the case 101, and is fixed there at its bottom surface with Ag paste or an AuSn brazing material 108. A necessary metallized pattern 109 and a recessed groove 110 are formed on the surface of the heat sink 107. The recessed groove 110 extends in the direction of width of the heat sink 107 to define one end portion region. A light emitting element 111 such as a light emitting diode or laser diode is mounted on the metallized pattern on one end portion side defined by the recessed groove 110 with an AuSn alloy, and the electrode of the light emitting element 111 and the metallized pattern 109 are wire-bonded to each other through an Au wire 112. A bare fiber guide groove 113 having a V-shaped section is formed in the surface of the heat sink 107 to extend linearly between the light emitting element 111 and bare fiber airtight sealing recess 105. A light receiving monitor element carrier 114 made of aluminum or the like to have a block shape is fixed at an adjacent position opposing the light emitting element 111 in the cavity 102 with Ag paste or an AuSn brazing material 115. A light receiving monitor element 116 such as a photodiode is mounted on one side surface of the light receiving monitor element carrier 114 with the AuSn brazing material. The electrode of the light receiving monitor element 116 is wire-bonded to a metallized pattern formed on the light receiving monitor element carrier 114 with an Au wire 117. The light receiving monitor element 116 forms a monitor for receiving part of light emitted by the light emitting element 111. The metallized patterns of the heat sink 107 and light receiving monitor element carrier 114 are wire-bonded to the metallized pattern 103 of the case 101 with Au wires 118. Thus, the light emitting element 111 and light receiving monitor element 116 are respectively electrically connected to the externally extending leads 104.

The optical fiber 10 is disposed to extend through the optical fiber fixing recess 106 and bare fiber airtight sealing recess 105 formed in the upper surface of the case 101, and the bare fiber guide groove 113 formed in the upper surface of the heat sink 107. The polyethylene jacket 12 at the distal end portion of the optical fiber 10 is removed to expose the bare fiber 11. This exposed bare fiber 11 is placed to extend through a region of the bare fiber guide groove 113 to the bare fiber airtight sealing recess 105, and the jacket 12 portion is placed in the optical fiber fixing recess 106. At this time, a distal end portion 11a of the bare fiber 11 is formed conically, and its distal end face is formed into a spherical surface. This distal end face opposes the light emitting element at a required gap and is axially aligned with the light emitting element 111. In addition, ultraviolet curing resins 119, 120, and 121 are filled in the required region of the bare fiber guide groove 113, i.e., a region covering almost half the upper surface of the heat sink 107 on a side opposite to the side facing the light emitting element 111, the bare fiber airtight sealing recess 105, and the optical fiber fixing recess 106. Furthermore, a bare fiber fixing glass plate 122 that can transmit the ultraviolet ray through it, and a bare fiber airtight sealing glass plate 123 are placed on the upper surface of the ultraviolet curing resin 119 of the bare fiber guide groove 113 and on the ultraviolet curing resin 120 of the bare fiber airtight sealing recess 105, respectively. The glass plates 122 and 123 and the ultraviolet curing resins 119 and 120 fix and support the bare fiber 11 in the bare fiber guide groove 113 and bare fiber airtight sealing recess 105. The ultraviolet curing resins 119, 120, and 121 are cured by irradiation with the ultraviolet ray to fix the bare fiber 11 and jacket 12 to the heat sink 107 and case 101, respectively. An airtight sealing glass cap 124 formed of a flat glass plate is placed on the cavity 102 and adhered to the upper surface of the case 101 with an ultraviolet curing resin 125, to airtightly seal the interior of the cavity 102. Although not shown in the drawings, light-shielding films are formed on the inner or outer surface of the airtight sealing glass cap 124 excluding its peripheral portion, so external light does not adversely affect the light emitting element 111 or light receiving monitor element 116 in the cavity 102.

A method of manufacturing the optical semiconductor device will be described. FIG. 7 is a flow chart of the manufacturing steps. The light emitting element 111 is mounted on the metallized pattern 109 of the heat sink 107 made of silicon. Regarding the mounting condition, for example, the light emitting element 111 is bonded to the heat sink 107 with the AuSn alloy in an $N_2$ gas atmosphere at 320° C. (S11). Similarly, the light receiving monitor element 116 is bonded to the light receiving monitor element carrier 114 with the AuSn alloy in an $N_2$ gas atmosphere at 320° C. (S12). The light receiving monitor element 116 and the metallized pattern of the light receiving monitor element carrier 114 are wire-bonded to each other with the Au wire 117 (S13). After that, the heat sink 107 and light receiving monitor element carrier 114 are mounted on the metallized pattern 103 on the inner bottom surface of the cavity 102 of the case 101 with Ag paste or AuSn brazing material (S14). Then, the metallized pattern 109 of the heat sink 107 and the light emitting element 111, the heat sink 107 and the metallized pattern 103 of the case 101, and the light receiving monitor element carrier 114 and the metallized pattern 103 of the case 101 are wire-bonded to each other with the Au wires 112 and 118, respectively, and the light emitting element 111 and light receiving monitor element 116 are electrically connected to the externally extending leads 104 of the case 101 (S15).

The optical fiber 10, from the distal end portion of which the polyethylene jacket 12 is removed, is placed on the case 101 and heat sink 107. At this time, the jacket 12 is placed on the optical fiber fixing recess 106 of the case 101, and the exposed bare fiber 11 is placed to extend from the bare fiber airtight sealing recess 105 of the case 101 to the bare fiber guide groove 113 of the heat sink 107. The bare fiber 11 is axially aligned with the light emitting element 111. The ultraviolet curing resin 119 is filled in the predetermined region of the bare fiber guide groove 113, the glass plate 122 is placed on the ultraviolet curing resin 119, and cure the ultraviolet curing resin 119 is irradiated with the ultraviolet ray. The ultraviolet curing resin 120 is filled in the bare fiber airtight sealing recess 105 in the upper surface of the case 101, the glass plate 123 is placed on the ultraviolet curing resin 120, and the ultraviolet curing resin 120 is irradiated and cured with the ultraviolet ray. The bare fiber 11 is fixed in this manner (S16). The ultraviolet curing resin 121 is sequentially filled in the optical fiber fixing recess 106. The ultraviolet curing resin 125 is applied around the cavity 102. The airtight sealing glass cap 124 is placed on the cavity 102. The ultraviolet curing resin 125 is irradiated and cured with the ultraviolet ray. In this manner, the jacket 12 of the optical fiber 10 is fixed, and airtight sealing of the interior of the cavity 102 is complete (S17).

Figure 8A:
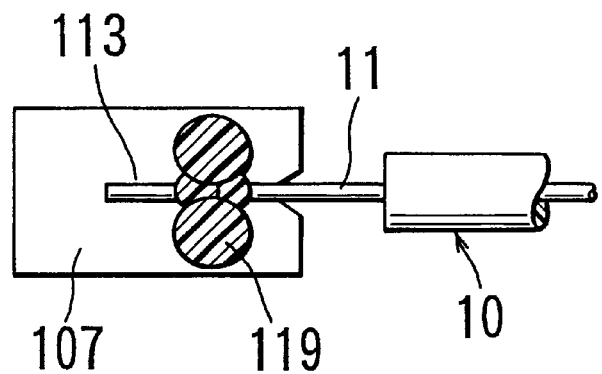
FIGS. 8A to 8C are conceptual views for explaining the optical fiber fixing step.
Figure 8B:
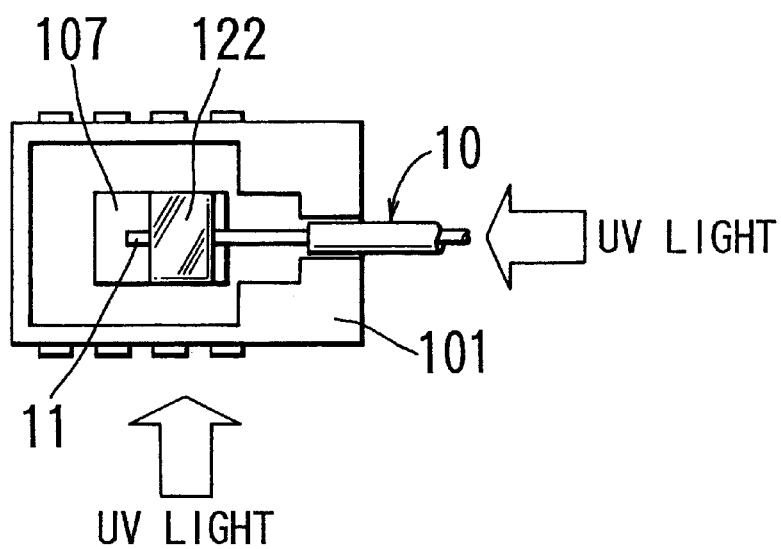

The bare fiber fixing step (S16) described above will be explained in detail with reference to FIGS. 8A to 8C. As shown in FIG. 8A, the case 101 and optical fiber 10 are set on an optical fiber fixing unit (not shown), and the exposed bare fiber 11 of the optical fiber is placed on the case 101 and the bare fiber guide groove 113 in the heat sink 107. The light emitting element 111 is made to emit light, and a light detection monitor is connected to the other end of the optical fiber 10. The position of the bare fiber 11 is slightly changed while monitoring the light intensity with this monitor. In this manner, the bare fiber 11 is positioned at a position in its longitudinal direction, where the monitor light becomes the maximum, with respect to the light emitting element 111, and the bare fiber 11 is pressed and held on the heat sink 107 with an optical fiber press (not shown). The ultraviolet curing resin 119 is applied to the bare fiber guide groove 113 with a dispenser. Subsequently, as shown in FIG. 8B, the bare fiber fixing glass plate 122 is placed on the ultraviolet curing resin 119. The upper surface of the case 101 is irradiated with an ultraviolet ray (UV light) having an illuminance of 120 mW/cm² at an angle of elevation of 45° in each of the direction of length of the bare fiber 11 and a direction perpendicularly intersecting it for about 60 sec, thereby curing the ultraviolet curing resin 119. Part of the ultraviolet ray is transmitted through the bare fiber fixing glass plate 122 to irradiate the ultraviolet curing resin 119.

Figure 8C:
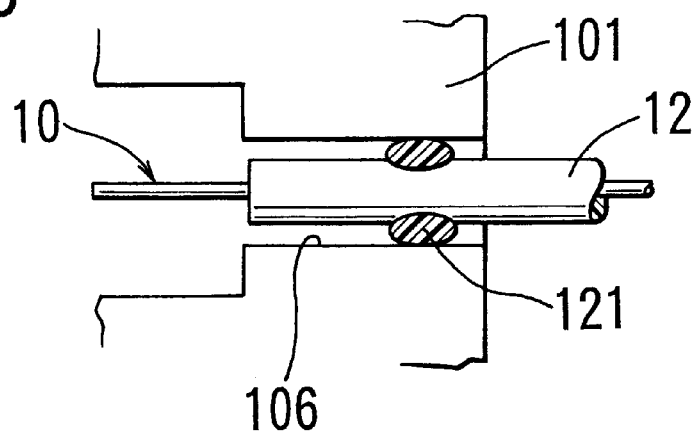

As shown in FIG. 8C, several drops (3 drops in this case) of ultraviolet curing resin 121 are applied to the interior of the optical fiber fixing recess 106, and the optical fiber fixing recess 106 is irradiated with the ultraviolet ray under the same condition as that described above. The ultraviolet curing resin 121 is cured accordingly, and the jacket 12 of the optical fiber 10 is temporarily fixed in the optical fiber fixing recess 106. After that, the product is removed from the optical fiber fixing unit.

Figure 9A:
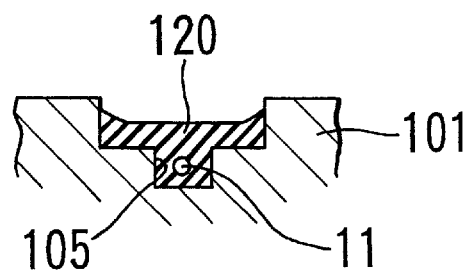
FIGS. 9A to 9D are conceptual views for explaining the airtight sealing step.
Figure 9B:
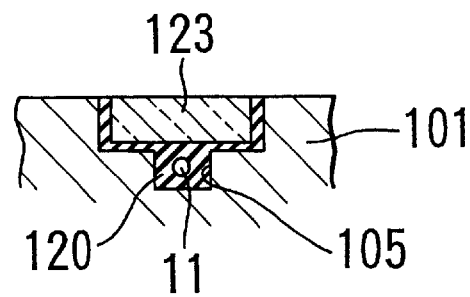
Figure 9C:
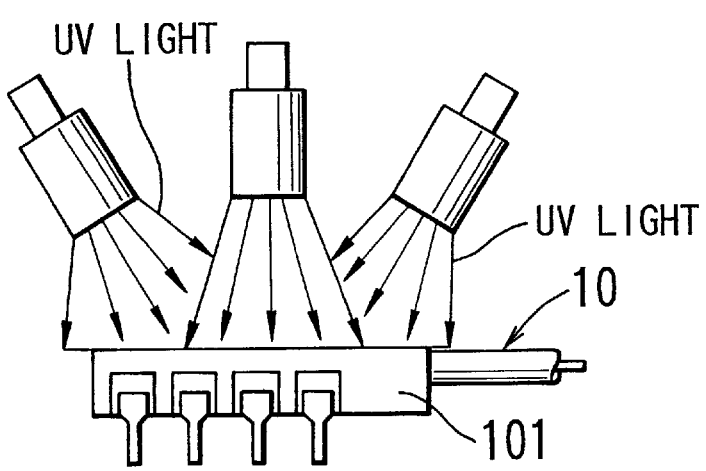
Figure 9D:
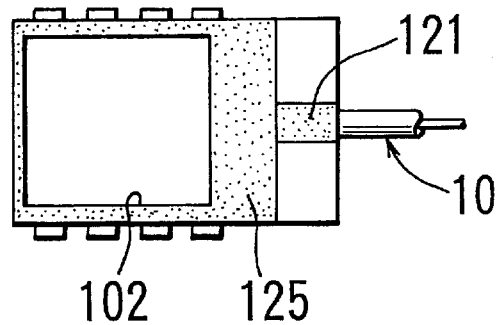
Figure 11:
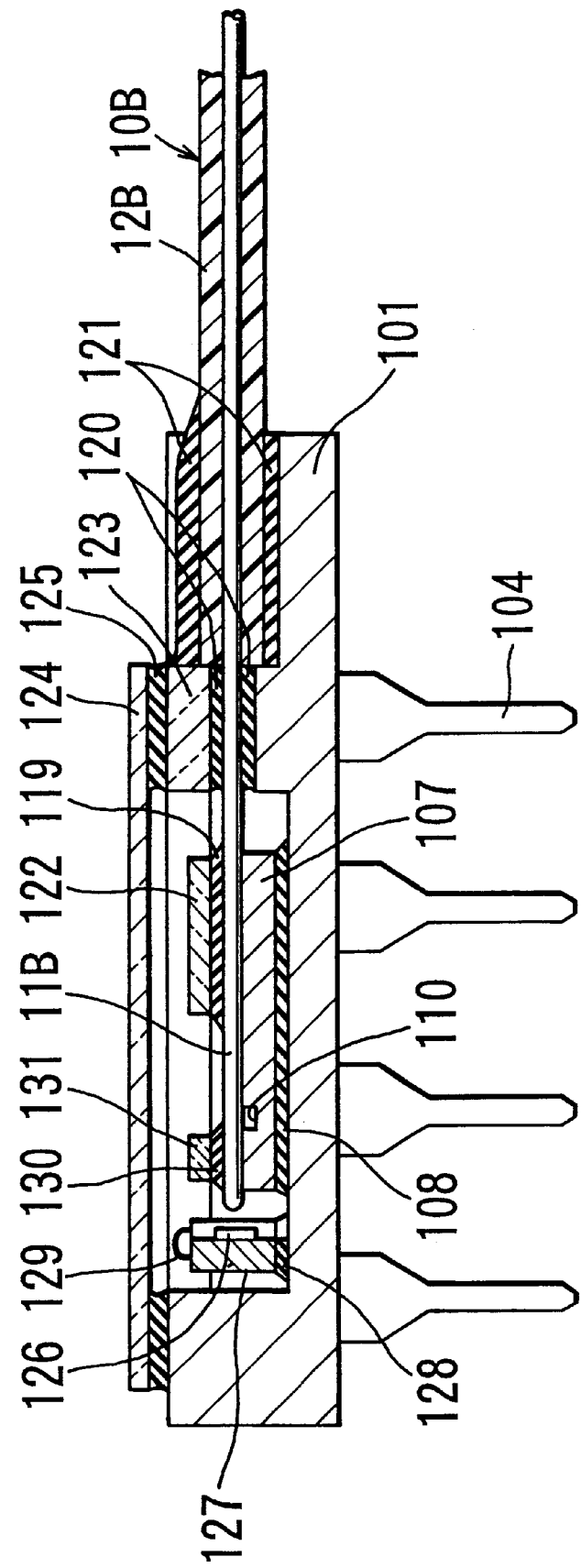
FIGS. 11 to 15 are sectional views taken along the lines XI—XI, XII—XII, XIII—XIII, XIV—XIV, and XV—XV, respectively, of FIG. 1.
Figure 12:
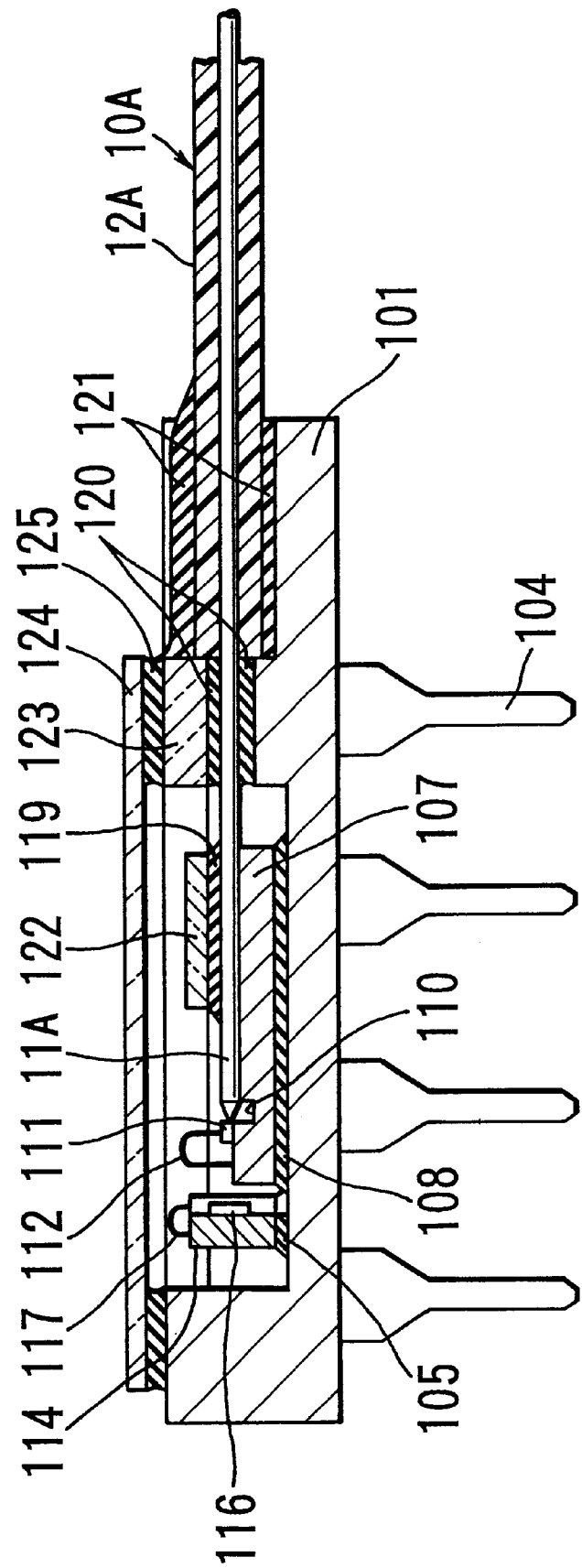
Figure 13:
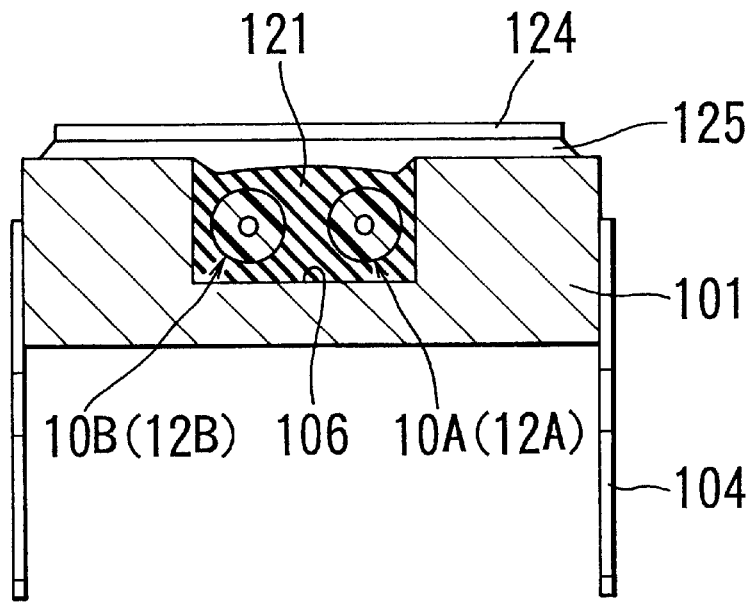
Figure 14:
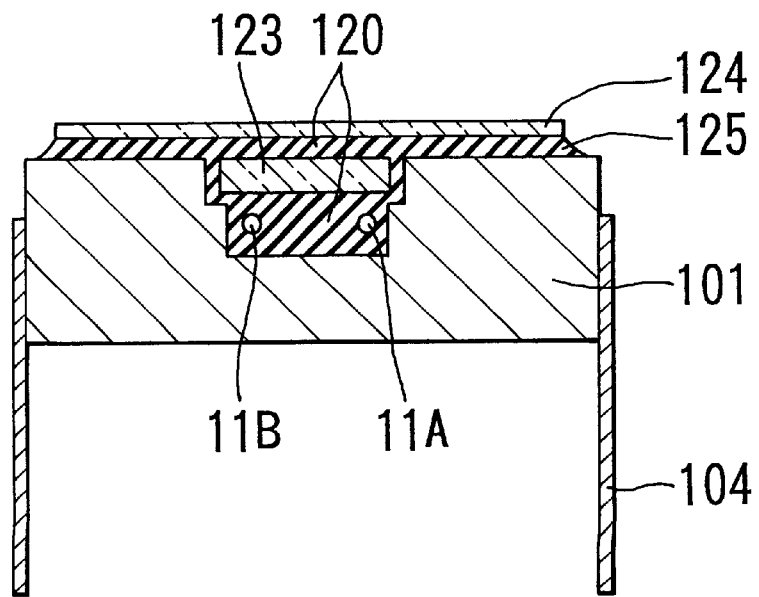
Figure 15:
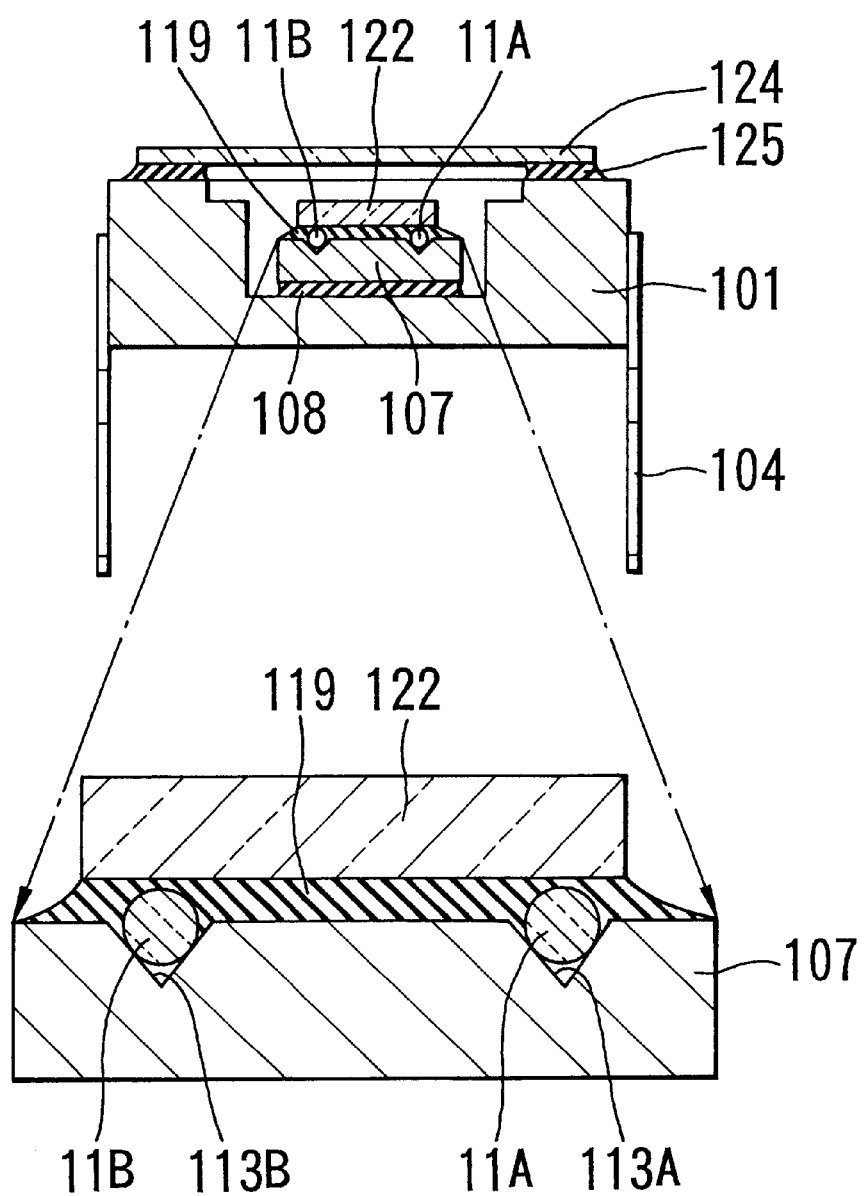

The airtight sealing step (S17) shown in FIG. 7 will be described in detail with reference to FIGS. 9A to 9D. As shown in FIG. 9A, the ultraviolet curing resin 120 is applied to the bare fiber airtight sealing recess 105 by using a dispenser (not shown), and subsequently the bare fiber airtight sealing glass plate 123 is placed on the ultraviolet curing resin 120, as shown in FIG. 9B. As shown in FIG. 9C, the ultraviolet curing resin 120 is irradiated and cured with the ultraviolet ray at an illuminance of 200 mW/cm$^2$ for 120 sec (60 sec×2) in three directions above the case 101. As a result, the bare fiber airtight sealing recess 105 through which the bare fiber 11 extends is sealed with the ultraviolet curing resin 120 and bare fiber airtight sealing glass plate 123. As shown in FIG. 9D, the ultraviolet curing resins 121 and 125 are applied to the optical fiber fixing recess 106 for temporarily fixing the jacket 12 of the optical fiber 10 in the previous step and around the cavity 102 in the upper surface of the case 101, respectively. The airtight sealing glass cap 124 is placed on the cavity 102. This structure is set in an $N_2$ gas atmosphere. The ultraviolet curing resin 121 is irradiated with an ultraviolet ray under the same condition as that in FIG. 9B to cure. As a result, the optical fiber 10 is fixed in the optical fiber fixing recess 106, and the light emitting element 111, light receiving monitor element 116, and bare fiber 11 in the cavity 102 are airtightly sealed with the airtight sealing glass cap 124, thus completing the optical semiconductor device of the present invention.

In this manner, in the optical semiconductor device according to the first embodiment, the bare fiber 11 is directly fixed to the case 101 and heat sink 107 by using the ultraviolet curing resins 119 and 120. A member that must be specially worked to hold the bare fiber is unnecessary, so that the number of working steps in the manufacture and assembly can be reduced. The bare fiber fixing glass plate 122 is placed on the ultraviolet curing resin 119 for fixing the bare fiber 11 to the heat sink 107. The bare fiber 11 is fixed in the bare fiber guide groove 113 with the cured ultraviolet curing resin 119 and bare fiber fixing glass plate 122. Even if the volume of the ultraviolet curing resin 119 is decreased by an amount corresponding to the volume of the bare fiber fixing glass plate 122, a sufficiently large strength required for fixing the bare fiber 11 can be assured. Since the bare fiber fixing glass plate 122 placed on the upper layer region of the ultraviolet curing resin 119 transmits the ultraviolet ray, regarding irradiation of the ultraviolet ray for curing the ultraviolet curing resin 119, the ultraviolet curing resin 119 present under the bare fiber fixing glass plate 122 can be irradiated with a sufficiently large amount of ultraviolet ray. Since the ultraviolet curing resin 119 can be sufficiently cured even to its lower layer, the fixing strength of the bare fiber 11 can be further increased. The bare fiber fixing glass plate 122 can decrease the total amount of ultraviolet curing resin 119, as described above. Therefore, cracking in the ultraviolet curing resin 119 caused by a stress applied to the bare fiber 11 can be suppressed, and accordingly the fixing strength of the bare fiber 11 can be further increased. In this embodiment, a portion where the exposed bare fiber 11 extends is present between a portion in the cavity 102 where the bare fiber 11 is fixed to the heat sink 107 and a portion in the case 101 where the bare fiber 11 is fixed in the bare fiber recess 105. Therefore, the stress applied to the case 101 or optical fiber 10 is absorbed by the exposed portion of the bare fiber 11, so that the affect of the stress on the bare fiber 11 is suppressed. As shown in the enlarged view of FIG. 5, while the bare fiber 11 is pressed into the bare fiber guide groove 113 of the heat sink 107, the ultraviolet curing resin 119 is supplied with the dispenser, the bare fiber fixing glass plate 122 is placed, and the ultraviolet curing resin 119 is cured to fix the bare fiber 11. The bare fiber 11 comes into substantial contact with the bare fiber guide groove 113, and the ultraviolet curing resin 119 does not enter between the bare fiber 11 and the heat sink 107, or enters only in a very small amount, even if it does. Therefore, axial misalignment among the light emitting element 111, light receiving monitor element 116, and bare fiber 11 caused by the coefficient of thermal expansion of the ultraviolet curing resin or the influence of expansion due to moisture absorption of the ultraviolet curing resin can be prevented. In other words, since the glass plate 122 can have any shape as far as it can fix the optical fiber, it can be a simple flat plate not requiring groove formation, decreasing the cost of the glass plate 122 as well.

Similarly, in the bare fiber airtight sealing recess 105 continuous to the cavity 102, the bare fiber 11 is fixed with the ultraviolet curing resin 120 and the bare fiber airtight sealing glass plate 123 placed on it. A decrease in volume of the ultraviolet curing resin 120 achieved by the bare fiber airtight sealing glass plate 123 and the ultraviolet ray transmitting effect of the glass plate 123 increase the fixing strength of the bare fiber 11. Cracking in the ultraviolet curing resin 120 is also prevented, providing a high airtight sealing effect. The optical fiber fixing recess 106 is formed continuously to the bare fiber airtight sealing recess 105, and the ultraviolet curing resin 121 for fixing the jacket 12 of the optical fiber 10 is filled in it. The adhesion strength between polyethylene of the jacket 12 of the optical fiber 10 and the ultraviolet curing resin 121 increases the fixing strength of the optical fiber 10. The ultraviolet curing resin 121 filled in the optical fiber fixing recess 106 also increases the airtightness in the bare fiber airtight sealing recess 105. Regarding the airtight sealing glass cap 124 fixed to the upper surface of the case 101 with the ultraviolet curing resin 125, when the ultraviolet curing resin 125 is irradiated and cured with the ultraviolet ray, sufficient curing can be expected because the ultraviolet ray is transmitted through the airtight sealing glass cap 124. As a result, the airtight sealing effect is enhanced.

The standard characteristics of Belcore test (TA-NWT-000983) are 1 kgf×5 sec×3 times. Regarding this, the optical semiconductor device of this embodiment showed characteristics of 1.2 kgf×5 sec×3 times or more. A product sufficiently satisfying the standard was obtained. The output fluctuation of the optical semiconductor device of this embodiment after a temperature cycle (a temperature of 85° C. and a humidity of 85% for 2,000 hours) was 6% with respect to ±10% of the standard output fluctuation. Hence, a product satisfying the standard was obtained in this respect as well. When red check was performed, it was confirmed that no leakage occurred in the bare fiber sealed portion. It is preferable that the ultraviolet curing resins 119, 120, and 121 be added with a filler made of silica having a good ultraviolet ray transmittance and that the coefficient of thermal expansion of the ultraviolet ray at a glass transition temperature or less fall within the range of 5.0E−5/° C. to 1.5E−5/° C. If the ultraviolet curing resin has a large amount of filler and the coefficient of thermal expansion becomes smaller than 1.5E–5/° C., the viscosity of the ultraviolet curing resin before curing becomes considerably high. Then, the resin filling performance is impaired. A decrease in holding strength occurs due to filling failure of the optical fiber fixing recess 106. A through hole is readily formed by filling failure of the bare fiber airtight sealing recess 105 to impair airtightness. Alternatively, the coating workability of the ultraviolet curing resin 125 for airtightly sealing the airtight sealing glass cap 124 becomes poor. The number of working steps increases, and moreover airtight damage due to filling failure tends to occur. If the amount of filler of the ultraviolet curing resin is small and the coefficient of thermal expansion becomes larger than 5.0E–5/° C., the viscosity of the ultraviolet curing resin before curing becomes considerably low. Then, a resin component separated from the ultraviolet curing resin 119 enters to fill the gap between the bare fiber guide groove 113 formed in the heat sink 107 and the bare fiber 11 (shown in the enlarged view of FIG. 5) by capillarity or the like. Since the resin component of the ultraviolet curing resin separated from the filler has a large coefficient of thermal expansion (about 7.7E–5/° C.), it expands and shrinks in accordance with a temperature difference under the environment where the optical semiconductor device is used, and the position of the bare fiber 11 relative to the heat sink 107 changes slightly (on the order of submicron), resulting in a change in axial positional relationship between the bare fiber 11 and light emitting element 111. This axial positional change between the bare fiber 11 and light emitting element 111 causes fluctuation in optical output of the optical semiconductor device.

FIG. 10 is a plan view of the second embodiment of the present invention, and FIGS. 11 to 15 are sectional views taken along the lines XI—XI, XII—XII, XIII—XIII, XIV—XIV, and XV—XV, respectively, of FIG. 10. In FIGS. 10 to 15, portions that are equivalent to those of the first embodiment are denoted by the same reference numerals. In the second embodiment, the present invention is applied to an optical semiconductor device in which a light emitting element 111 and light receiving element 126 are mounted in a case 101 and two optical fibers 10A and 10B corresponding to the light emitting and receiving elements 111 and 126, respectively, are fixed to the case 101. This optical semiconductor device emits an optical signal through one light emitting optical fiber 10A and receives an optical signal through the other light receiving optical fiber 10B. In the same manner as in the first embodiment, the case 101 has a rectangular shape and is made of a ceramic material, e.g., alumina or aluminum nitride. A rectangular cavity 102 is formed in a region of the upper surface of the case 101 close to one end in the longitudinal direction. A necessary metallized pattern 103 is formed on the inner bottom surface of the cavity 102. Externally extending leads 104 disposed on the side surface of the case 101 are brazed to the metallized pattern 103 with an AgCu alloy. A bare fiber airtight sealing recess 105 and an optical fiber fixing recess 106 continuous to it are formed on the other end side of the upper surface of the case 101 facing the cavity 102. The section of the bare fiber airtight sealing recess 105 forms a stepped portion having a deep central portion, and this deep central portion has such a size that the two bare fibers are inserted there parallel to each other. The optical fiber fixing recess 106 is formed to have a size enough to receive the jackets of the two optical fibers 10A and 10B parallel to each other.

A heat sink 107 formed of a silicon plate is mounted in the cavity 102, and is fixed there at its bottom surface with Ag paste or an AuSn brazing material 108. A necessary metallized pattern 109 and a recessed groove 110 are formed on the surface of the heat sink 107. The recessed groove 110 extends in the widthwise direction of the heat sink 107 to define one end portion region. The light emitting element 111 such as a light emitting diode or laser diode is mounted on the metallized pattern 109 on one end portion side defined by the recessed groove 110 with an AuSn alloy, and the electrode of the light emitting element 111 and the metallized pattern 109 are wire-bonded to each other through an Au wire 112. A light receiving monitor element carrier 114 made of aluminum or the like to have a block shape and a light receiving element carrier 127 are fixed at an adjacent position opposing the light emitting element 111 in the cavity 102 with Ag paste or AuSn brazing materials 115 and 128. A light receiving monitor element 116 such as a photodiode is mounted on one side surface of the light receiving monitor element carrier 114 with the AuSn brazing material. The electrode- of the light receiving monitor element 116 is wire-bonded to the metallized pattern formed on the light receiving monitor element carrier 114 with an Au wire 117. Similarly, the light receiving element 126 such as a photodiode is mounted on one side surface of the light receiving element carrier 127 with the AuSn brazing material, and the electrode of the light receiving element 126 is wire-bonded to the metallized pattern formed on the light receiving element carrier 127 with Au wires 129. The metallized patterns of the heat sink 107, light receiving monitor element carrier 114, and light receiving element carrier 127 are wire-bonded to the metallized pattern of the case 101 with an Au wire 118. Thus, the light emitting element 111, light receiving element 126, and light receiving monitor element 116 are respectively electrically connected to the externally extending leads 104.

Two bare fiber guide grooves 113A and 113B having a V-shaped section are formed on the surface of the heat sink 107 to linearly extend between the light emitting element 111 and light receiving element 126, and the bare fiber airtight sealing recess 105. The light emitting and receiving optical fibers 10A and 10B are disposed parallel to each other to extend through the optical fiber fixing recess 106 and bare fiber airtight sealing recess 105 formed in the upper surface of the case 101, and the two bare fiber guide grooves 113A and 113B formed in the upper surface of the heat sink 107. Polyethylene jackets 12A and 12B at the distal end portions of the optical fibers 10A and 10B are removed to expose bare fibers 11A and 11B. These exposed bare fibers 11A and 11B are placed to extend through a region of the bare fiber guide grooves 113A and 113B to the bare fiber airtight sealing recess 105, and the jacket portions 12A and 12B are placed in the optical fiber fixing recess 106. At this time, the distal end portion of the bare fiber 11A of the light emitting optical fiber 10A is formed conically, and its distal end face is formed into a spherical surface. This distal end face opposes the light emitting element 111 at a required gap and is axially aligned with the light emitting element 111. The distal end portion of the bare fiber 11B of the light receiving optical fiber 10B is formed to have a taper inclined with respect to the optical axis. This tapered distal end face opposes the light receiving element 126 at a required gap and is axially aligned with the light receiving element 126.

In addition, ultraviolet curing resins 119 and 130 are filled in the required regions of the bare fiber guide grooves 113A and 113B, i.e., regions covering almost half the upper surface of the heat sink 107 on a side opposite to the side facing the light emitting element 111 and including the bare fiber guide grooves 113A and 113B, and the region of the bare fiber guide groove 113B on one end side opposing the light receiving element 126. Similarly, ultraviolet curing resins 120 and 121 are filled in the bare fiber airtight sealing recess 105 and optical fiber fixing recess 106, respectively. Furthermore, bare fiber fixing glass plates 122 and 131 that can transmit the ultraviolet ray through them, and a bare fiber airtight sealing glass plate 123 are placed on the upper surfaces of the two ultraviolet curing resins 119 and 130 of the bare fiber guide grooves 113A and 113B and on the ultraviolet curing resin 120 of the bare fiber airtight sealing recess 105, respectively. The respective ultraviolet curing resins are irradiated and cured with the ultraviolet ray. Thus, the glass plates 122 and 131 and the ultraviolet curing resins 119 and 130 fix and support the bare fibers 11A and 11B of the light emitting and receiving optical fibers 10A and 10B in the bare fiber guide grooves 113A and 113B, and similarly the glass plate 123 and ultraviolet curing resin 120 fix, support, and seal the bare fibers 11A and 11B in the bare fiber airtight sealing recess 105. Also, the ultraviolet curing resin 121 in the optical fiber fixing recess 106 fixes the jackets 12A and 12B of the respective optical fibers 10A and 10B. An airtight sealing glass cap 124 formed of a flat glass plate is placed on the cavity 102 and adhered to the upper surface of the case 101 with an ultraviolet curing resin 125, to airtightly seal the interior of the cavity 102. Light-shielding films are formed on the inner or outer surface of the airtight sealing glass cap 124 excluding its peripheral portion, so that external light does not adversely affect the light emitting element 111 or light receiving element 126 in the cavity 102.

A method of manufacturing the optical semiconductor device according to the second embodiment is almost identical to that for manufacturing the optical semiconductor device according to the first embodiment, and a detailed description thereof will accordingly be omitted. Note that the second embodiment requires the step of assembling the light receiving element 126 and light receiving optical fiber 10B in the case 101. The light receiving element 126 can be assembled in the same manner as the light receiving monitor element 116. The light receiving optical fiber 10B can be assembled simultaneously with the light emitting optical fiber 10 of the first embodiment.

In the optical semiconductor device of the second embodiment, the bare fibers 11A and 11B of the light emitting and receiving optical fibers 10A and 10B are directly fixed to the case 101 and heat sink 107 by using the ultraviolet curing resins 119, 120, 121, and 130. A member that must be specially worked to hold the bare fibers 11A and 11B is unnecessary, so that the number of working steps in the manufacture and assembly can be reduced. The bare fiber fixing glass plates 122 and 131 are placed on the ultraviolet curing resins 119 and 130 for fixing the bare fibers 11A and 11B to the heat sink 107. The bare fibers 11A and 11B are fixed in the bare fiber guide grooves 113A and 113B with the cured ultraviolet curing resins 119 and 130 and bare fiber fixing glass plates 122 and 131. Even if the volume of each of the ultraviolet curing resins 119 and 130 is decreased by an amount corresponding to the volume of each of the bare fiber fixing glass plates 122 and 131, a sufficiently large strength required for fixing the bare fiber can be assured. Since the bare fiber fixing glass plates 122 and 131 placed on the upper layer regions of the ultraviolet curing resins 119 and 130 transmit the ultraviolet ray, regarding radiation of the ultraviolet ray for curing the ultraviolet curing resin, the ultraviolet curing resins 119 and 130 present under the bare fiber fixing glass plates 122 and 131 can be irradiated with a sufficiently large amount of ultraviolet ray. Since these ultraviolet curing resins can be sufficiently cured even to their lower layers, the fixing strength of the bare fibers 11A and 11B can be further increased. The bare fiber fixing glass plates 122 and 131 can decrease the total amount of each of the ultraviolet curing resins 119 and 130, as described above. Therefore, cracking in the ultraviolet curing resin caused by a stress applied to the bare fiber 11A or 11B can be suppressed, and accordingly the fixing strength of the bare fiber can be further increased. Furthermore, a portion where the exposed bare fibers 11A and 11B extend is present between a portion in the cavity 102 where the bare fibers 11A and 11B are fixed to the heat sink 107 and a portion in the case 101 where the bare fibers 11A and 11B are fixed in the bare fiber recess 105. Therefore, the stress applied to the case 101 or optical fiber 10A or 10B is absorbed by the exposed portion of each bare fiber, so that the affect of the stress on the bare fiber is suppressed. As shown in the enlarged view of FIG. 15, while the bare fibers 11A and 11B are pressed into the bare fiber guide grooves 113A and 113B of the heat sink 107, the ultraviolet curing resin 119 is supplied with the dispenser, the bare fiber fixing glass plate 122 is placed, and the ultraviolet curing resin 119 is cured to fix the bare fibers 11A and 11B. The bare fibers 11A and 11B come into substantial contact with the bare fiber guide grooves 113A and 113B, and the ultraviolet curing resin 119 does not enter between the bare fibers 11A and 11B and the heat sink 107, or enters only in a very small amount, even if it does. Therefore, axial misalignment among the light emitting element 111, light receiving monitor element 116, and bare fibers 11A and 11B caused by the coefficient of thermal expansion of the ultraviolet curing resin or the influence of expansion due to moisture absorption of the ultraviolet curing resin can be prevented. In other words, since the glass plate 122 can have any shape as far as it can fix an optical fiber, it can be a simple flat plate not requiring groove formation, decreasing the cost of the glass plate 122 as well.

Similarly, in the bare fiber airtight sealing recess 105, the bare fibers 11A and 11B are fixed with the ultraviolet curing resin 120 and the bare fiber airtight sealing glass plate 123 placed on it. A decrease in volume of the ultraviolet curing resin 120 achieved by the bare fiber airtight sealing glass plate 123 and the ultraviolet ray transmitting effect of the glass plate 123 increase the fixing strength of the bare fiber. Cracking in the ultraviolet curing resin 120 is also prevented, providing a high airtight sealing effect. The optical fiber fixing recess 106 is formed continuously to the bare fiber airtight sealing recess 105, and the ultraviolet curing resin for fixing the jackets 12A and 12B of the optical fibers 10A and 10B is filled in it. The adhesion strength between the polyethylene resin of the jackets 12A and 12B and the ultraviolet curing resin 120 increases the fixing strength of the optical fiber. The ultraviolet curing resin 121 filled in the optical fiber fixing recess 106 also increases the airtightness in the bare fiber airtight sealing recess 105. Regarding the airtight sealing glass cap 124 fixed to the upper surface of the case 101 with the ultraviolet curing resin 125, when the ultraviolet curing resin 125 is irradiated and cured with the ultraviolet ray, sufficient curing can be expected because the ultraviolet ray is transmitted through the airtight sealing glass cap 124. As a result, the airtight sealing effect is enhanced.

The present invention is not limited to the arrangements of the optical semiconductor devices of the first and second embodiments. In an optical semiconductor device in which an optical fiber is fixed by using an ultraviolet curing resin or other photosetting resin as well, when a transparent plate that transmits light for curing the photosetting resin is placed on the photosetting resin and the photosetting resin is irradiated with light through the transparent plate, the photosetting resin can be sufficiently cured to its lower layer.

As has been described above, according to the present invention, in an optical semiconductor device in which the end portion of an optical fiber optically coupled to an optical element mounted in a case is fixed to the case with a photosetting resin, a transparent plate that transmits light for curing the photosetting resin is placed on the upper layer portion of the photosetting resin. This transparent plate is integrated with the cured photosetting resin. Even if the volume of the photosetting resin is decreased by an amount corresponding to the volume of the transparent plate, a required sufficiently high strength can be assured, and cracking is decreased by a decrease in the resin amount. Even the lower layer of the photosetting resin can be irradiated with a sufficient amount of light. Thus, the photosetting resin can be sufficiently cured even to its lower layer, further increasing the fixing strength of the bare fiber. Since the bare fiber of the optical fiber is disposed in the recess formed in the case and is fixed with the photosetting resin and transparent plate, a member that must be specially worked to fix the bare fiber to the case is unnecessary, so that manufacture and assembly of the optical semiconductor device can be simplified. Since the bare fiber is fixed to the case at portions spaced apart from each other at required gaps in the longitudinal direction, the stress applied to the case or optical fiber is absorbed by portions among the fixed portions of the bare fiber, so that the influence of stress on the bare fiber is suppressed.

What is claimed is:

1. An optical semiconductor device having an optical element mounted in a case and an optical fiber fixed to said case with a first photosetting resin, comprising a transparent plate placed on a surface layer portion of said first photosetting resin, said plate being transparent to light that cures said first photosetting resin.

2. A device according to claim 1, wherein said transparent plate is integrated with said cured first photosetting resin, and said optical element is a light emitting element.

3. A device according to claim 2, wherein said optical fiber comprises a bare fiber and a jacket covering said bare fiber, and said bare fiber is placed in a recess formed in said case or a member mounted on said case, and is fixed between a second photosetting resin filled in said recess and said transparent plate placed on said surface layer portion of said first photosetting resin to be integrated with said first photosetting resin.

4. A device according to claim 3, wherein said bare fiber is fixed to said case with said first and second photosetting resins at a plurality of portions spaced apart from each other in a longitudinal direction thereof.

5. A device according to claim 3, wherein each of said first and second photosetting resins is an ultraviolet curing resin, and said transparent plate is a glass plate that can transmit an ultraviolet ray.

6. The device of claim 1, wherein said transparent plate is transparent to ultraviolet light.

7. An optical semiconductor device comprising a case, a heat sink fixed to a bottom portion in a cavity recessed in an upper surface of said case, an optical element mounted in said cavity, a bare fiber guide groove formed in a surface of said heat sink to have a V-shaped section, a bare fiber airtight sealing recess formed in said upper surface of said case facing said cavity, an optical fiber fixing recess formed in said upper surface of said case to be continuous to said bare fiber airtight sealing recess, an optical fiber having a bare fiber exposed at one end portion thereof, said disposed bare fiber being disposed to extend from said bare fiber guide groove to said bare fiber airtight sealing recess, and said optical fiber having a jacket disposed in said optical fiber fixing recess, a photosetting resin filled in each of said bare fiber guide groove, said bare fiber airtight sealing recess, and said optical fiber fixing recess, a transparent plate that is transparent to light that cures said photosetting resin, is placed on a surface layer portion of said photosetting resin to cover said bare fiber guide groove and said bare fiber airtight sealing recess, and is integrated with said cured photosetting resin, and an airtight sealing cap fixed to said upper surface of said case with said photosetting resin applied around said cavity to cover said cavity.

8. A device according to claim 7, wherein a light emitting element and a light receiving element are mounted each as said optical element, said optical fiber comprises two optical fibers each having one end portion disposed to oppose corresponding one of said light emitting and receiving elements, and said two optical fibers have bare fibers fixed in two bare fiber guide grooves formed in said surface of said heat sink with said photosetting resin and said transparent plate.

9. A device according to claim 7, wherein said airtight sealing cap is formed with a light-shielding film formed at a region thereof covering said cavity.

10. A device according to claim 7, wherein said photosetting resin is an ultraviolet curing resin, and said transparent plate is a glass plate that can transmit an ultraviolet ray.

11. An optical semiconductor device comprising:

an optical element in a case;

an optical fiber affixed to said case with an ultraviolet light curing resin; and a plate that is transparent to ultraviolet light and that is embedded in a surface of said resin and exposes said resin to ultraviolet light when ultraviolet light is directed onto said plate.

\* \* \* \* \*